United States Patent [19]

Vredenbregt et al.

[11] Patent Number: 4,626,014

[45] Date of Patent: Dec. 2, 1986

[54] GRIPPER HAVING GRIPPER ARMS SUPPORTED IN A ROTATABLE SLIDING GUIDE

[75] Inventors: Jakob Vredenbregt; Johannes W. C. M. Van Gerwen; Petrus H. de Leeuw; Franciscus T. Vleeskens, all of Eindhoven, Netherlands

[73] Assignee: U.S. Philips Corporation, New York, N.Y.

[21] Appl. No.: 791,859

[22] Filed: Oct. 28, 1985

[30] Foreign Application Priority Data

May 29, 1985 [NL] Netherlands ................. 8501524

[51] Int. Cl.⁴ .............................................. B25B 5/04
[52] U.S. Cl. .................................. 294/88; 294/106
[58] Field of Search ............. 294/88, 106, 116, 83.24, 294/104, 115, 100, 118, 87.1; 414/739, 751, 753; 269/32, 34, 257, 264

[56] References Cited

U.S. PATENT DOCUMENTS 4,452,479 6/1984 Terai et al. ........................ 294/88
4,504,211 10/1985 Masserang ........................ 294/88
4,569,549 2/1986 Nakashima et al. ................ 294/88

Primary Examiner—James B. Marbert
Attorney, Agent, or Firm—Robert T. Mayer

[57] ABSTRACT

A gripper having at least two gripper arms (1, 3) which are arranged mirror-symmetrically around a center line (5) and a first end (7, 9) of which follows approximately a straight line (19) which is perpendicular to the center line (5), while the second end (21, 23) is displaceable along a circular track (33, 35). A gripper arm (1, 3) is supported between the first end (7, 9) and the second end (21, 23) in a rotatable sliding guide (41, 43) occupying a fixed position with respect to the center (29, 31) of the respective circular track (33, 35). The dimensions of the gripper mechanism described are such that a minimum tolerance of the position of the first ends (7, 9) parallel to the center line (5) is obtained. The gripper requires a considerably reduced calculation capability from the processor to be used for positioning the gripper arms (1, 3).

4 Claims, 4 Drawing Figures

GRIPPER HAVING GRIPPER ARMS SUPPORTED IN A ROTATABLE SLIDING GUIDE

The invention relates to a gripper having at least two relatively displaceable first ends of two gripper arms arranged mirror-symmetrically around a centre line and at least two second ends of said gripper arms displaceable along circles having equal diameters.

When gripping an object of previously known dimensions situated, for example, on a horizontal table surface by means of a gripper coupled to a manipulator or a robot, a distinction is generally made between an approaching stage to a predetermined reference point effected with a fully opened gripper and a gripping stage. At the reference point, the centre line of the gripper is, for example, perpendicular to the table surface and the gripper arms are situated on either side of the object. Subsequently, in the gripping stage, the distance between first ends of the gripper arms is reduced to such an extent that they become located on either side against the object. The said ends are then pressed against the object with a predetermined force. During the gripping stage, the first ends of the gripper arms generally follow a part of a circular track. A gripper operating according to the principle described above is known, for example, from an article of Ren-Chyuan Luo and David Grande, published on the occasion of "First International Conference on Robotics" (I.E.E.E.) in Atlanta USA on 13-15 March 1984 and entitled "Servo-controlled Gripper with Sensors for Flexible Assembly", p. 451-460. Due to the circular track, which is followed in the gripping stage by the first ends of the gripper arms, the height above the table surface on which objects of different widths are gripped varies. The overall tolerance of the first ends of the gripper arms is therefore composed of two components. The first component originates from the manipulator in itself and leads to deviations at the aforementioned reference point at which the gripper is situated at the beginning of the gripping stage. The second component of the tolerance is due to the circular track followed by the first ends of the gripper arms with different object widths. For different object widths, the first component can be considered to be comparatively constant with respect to the second component.

The invention is based on the recognition of the fact that the calculation capability of the processor used for positioning the gripper which is required for gripping an object is considerably reduced if it is ensured that the second component of the tolerance is smaller than the first component. This means in other words that positioning calculations by the processor are superfluous and therefore can be omitted in the gripping stage and analogously also in the so-called opening stage.

A gripper according to the invention is for this purpose characterized in that each of the gripper arms is supported between its first and its second end in a sliding guide which is rotatable about a point occupying a fixed position with respect to the centre of the circle along which the second end is displaceable, while for each gripper arm the connection line between the centre of the said circles and the point of rotation of the respective sliding guide is parallel to the said centre line and in a rectangular coordinate system with a Y axis parallel to the centre line and with the point of rotation of the sliding guide of each of the gripper arms as origin the relations are satisfied:

$$Y = L \cos \beta - R \cos \alpha - c \leq Y_o$$

$$|Y - Y_o| = |L(\cos \beta - 1) - R(\cos \alpha - 1)| \leq |W|,$$

where:
- $Y$ = the distance of the point of rotation of the sliding guide from the first end of the respective girpper arm with $Y = Y_o$ for $\alpha = 0$
- $|Y - Y_o|$ = the absolute value of $Y_o$,
- $L$ = the length of the gripper arm,
- $\beta$ = the angle between the gripper arm and the Y axis,
- $R$ = the radius of the circle along which the second end is displaceable,
- $c$ = the distance between the centre of a circle and the point of rotation of the respective sliding guide,
- $\alpha$ = the angle between the Y axis and the radius vector of the second end,
- $|W|$ = the absolute value of the maximum tolerance in a direction parallel to the Y axis of the position of the gripper at a reference point P.

Due to the fact that the first ends of the gripper arms follow a track which is such an approximation of a straight line that the deviation therefrom (second component of the tolerance) is smaller than the tolerance of the reference point (the first component of the tolerance or manipulator tolerance), the overall tolerance in the height of the gripping points above the table surface is kept within such narrow limits that positioning calculations for the height of the gripper above the table surface in the gripping stage and the opening stage can be omitted.

A particular embodiment of the gripper having a comparatively compact gripper construction is further characterized in that the sliding guide of each of the gripper arms is connected by means of a coupling rod to a driving rod independently controllable and extending parallel to the Y axis, the coupling rod being guided rotatably and slidably with respect to the driving rod.

A further embodiment of the gripper having a gripper construction of a comparatively small weight is characterized in that the driving rod forms part of a double-acting driven pneumatically plunger.

The invention will be described more fully with reference to the drawing, in which.

Figure 1:
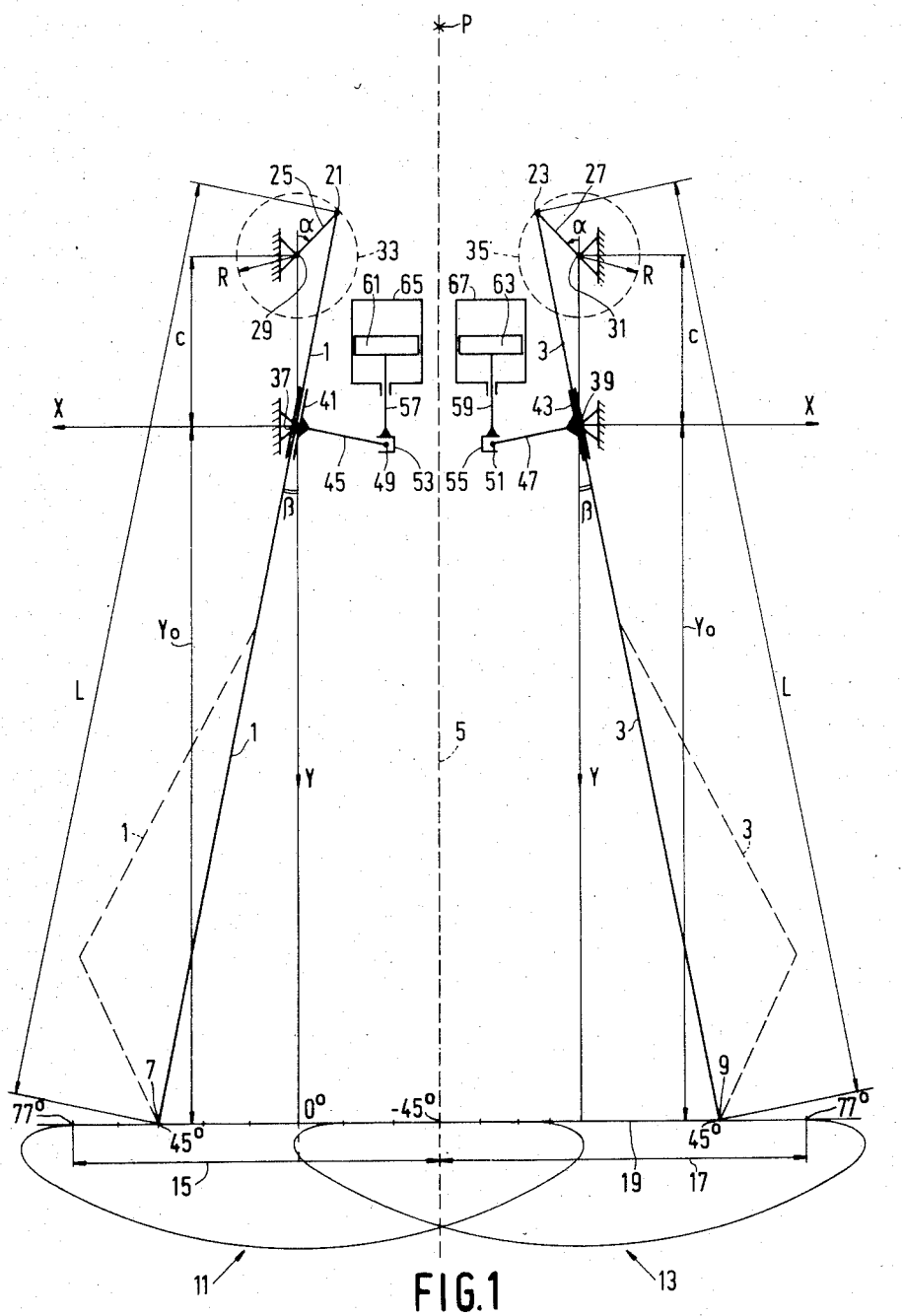
FIG. 1 shows diagrammatically a pair of gripper arms inclusive of drives.

The gripper shown in FIG. 1 has two relatively displaceable gripper arms 1 and 3, which are arranged mirror-symmetrically around a centre line 5. First ends 7 and 9 of the gripper arms 1 and 3 are displaceable along tracks 11 and 13, of which parts 15 and 17 are an approximation of a straight line 19. Second ends 21 and 23 of the gripper arms 1 and 3 are in the form of pivots, in which crank rods 25 and 27 are rotatably connected to the gripper arms. The crank rods 25 and 27 are rotatable about pivots 29 and 31, which are arranged at the centres of circles 33 and 35 with a radius R. The second ends 21 and 23 are therefore displaceable along the circles 33 and 35. Furthermore, the gripper arms are supported at fixed points 37 and 39 in rotatable sliding guides 41 and 43, which are rigidly secured to coupling rods 45 and 47 and extend in a direction at right angles to the gripper arms 1 and 3. The coupling rods 45 and 47 are guided rotatably and slidably with their ends 49 and 51 in bearings 53 and 55, which are secured to driving rods 57 and 59. To the driving rods 57 and 59 are secured pistons 61 and 63 which can perform a reciprocating translatory movement in cylinders 65 and 67. The driving rods 57 and 59 constitute together with the pistons 61 and 63 plungers which can be controlled electropneumatically in a known manner via servovalves. In order to simplify the kinematic description of the gripper, in FIG. 1 each of the gripper arms is arranged in a rectangular coordinate system X-Y (origin 37,39), the Y axis being parallel to the centre line 5. It is further assumed that the gripper is suspended in a usual manner at a reference point P in a displacement mechanism, such as, for example, an anthropomorphous robot of the kind described by J. G. van den Hanenberg and J. Vredenbregt in "Philips Technical Review", Vol. 40, 1982, No. 2/3, p. 33–45. In the present case, the angle $\alpha$ between the crank rods 25 and 27 and the respective Y axis can vary from $-45°$ to $+77°$. $\alpha = -45°$ corresponds to a closed gripper, while $\alpha = +77°$ corresponds to a fully opened gripper. For the sake of simplicity, the gripper arms 1 and 3 are indicated in FIG. 1 as straight rods. Actually, the gripper arms 1 and 3 have the form indicated in dotted lines. The connection lines between the centres of the circles 33 and 35 and the points 37 and 39 are parallel to the centre line 5 and have a length c. The length (so-called straight length) of the gripper arms 1 and 3 is L, while the angle between the gripper arms 1 and 3 and the Y axes is equal to $\beta$. The relation between $\alpha$ and $\beta$ is as follows:

$$tg\beta = \frac{R\sin\alpha}{c + R\cos\alpha}$$

It is assumed that the Y value of the first ends 7 and 9 for $\alpha = 0°$ (and $\beta = 0°$) is equal to $Y_o$.

The overall tolerance or accuracy in the Y direction, with which the first ends 7 and 9 of the gripper arms 1 and 3 can be positioned, consists of the algebraic sum of the aforementioned first and second components. The first component of the overall tolerance is formed by the absolute accuracy in the Y direction of the reference point P. Due to friction, clearance and temperature effects in the displacement mechanism (robot), the first component is of the order of 0.1 mm (=W). The second component of the overall tolerance is formed by the deviation in the Y direction of the ends 7 and 9 from the straight line 19, which is at right angles to the centre line 5. This deviation is equal to the difference between Y and $Y_o$. Compensation of the deviation originating from the first component by the deviation originating from the second component can therefore be obtained when the relations are satisfied:

$Y - Y_o \leq 0$ and $|Y - Y_o| \leq |W|$ with $Y = L\cos\beta - R\cos\alpha - c.$ It is clear that for this purpose use has to be made of the parts 15 and 17 of the tracks 11 and 13, which are a closest possible approximation of the straight line 19. It should be noted that due to the force of gravity the first component W is always positive in the positive Y direction, whereas the second component $Y - Y_o$ must always be negative. By a suitable choice of the parameters R, c and L, the aforementioned conditions can be fulfilled. Moreover, it is possible to satisfy with already fixed values for R and c the said conditions by a suitable choice of L. In the case in which the gripper is coupled to different displacement mechanisms with different values of the first component W, the overall tolerance can be kept within narrow limits by varying L. The gripper arms can have a telescopic construction for this purpose.

It can be seen from the table below that the second component $Y - Y_o$ partly compensates the first component W for the different values of $\alpha$. In the present case, $c = 23.5$ mm, $L = 129$ mm and $R = 8.5$ mm. Due to the scale used in FIG. 1, the absolute value $|Y - Y_o|$, which is comparatively small, is not or substantially not visible.

| $\alpha$ | $\beta$ | $Y-Y_o$ |
|---|---|---|
| 10° | 2.65° | −0.0087 mm |
| 20° | 5.27° | −0.0326 mm |
| 30° | 7.84° | −0.0670 mm |
| 40° | 10.31° | −0.1012 mm |
| 50° | 12.66° | −0.1113 mm |
| 60° | 14.85° | 0.0586 mm |

Figure 2:
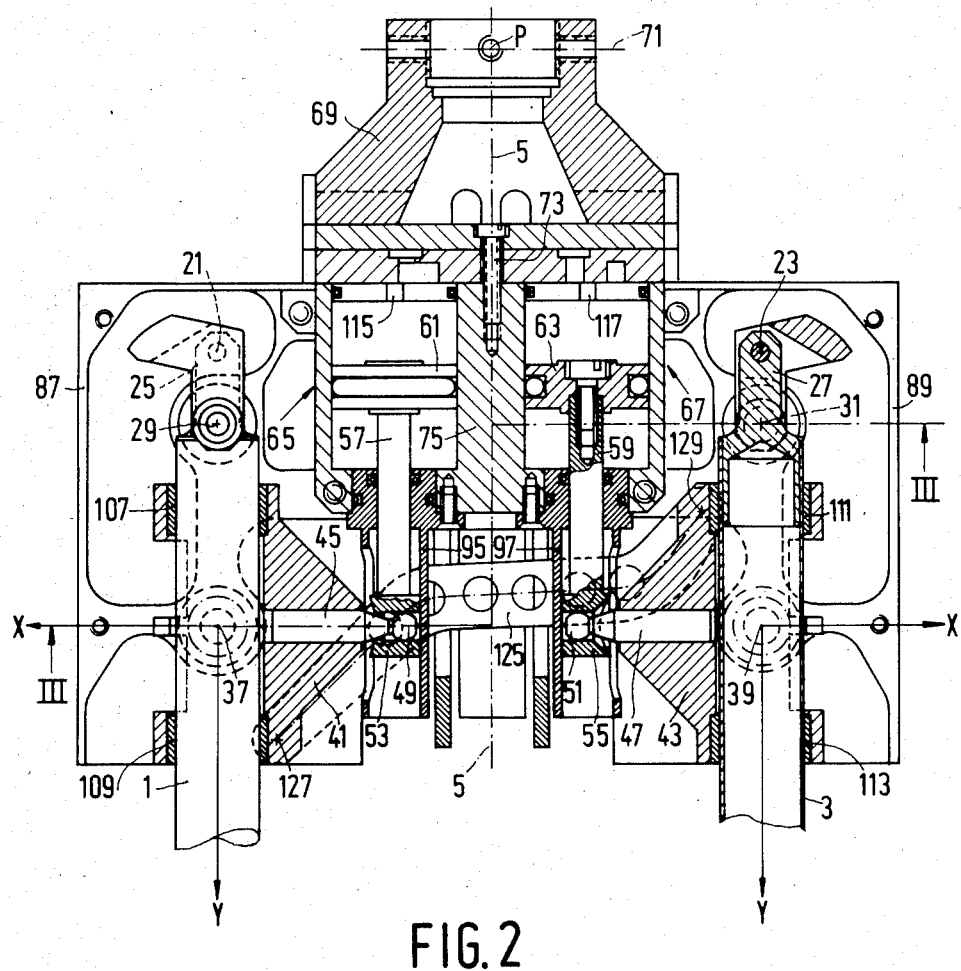
FIG. 2 is a sectional view of a gripper shown in FIG. 1.
Figure 3:
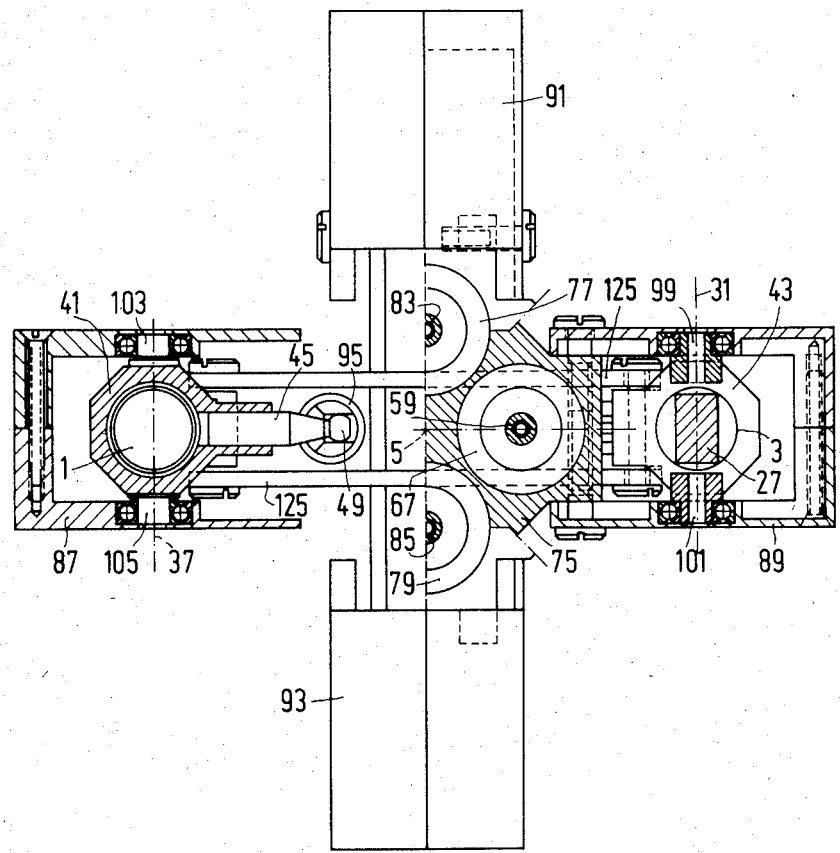
FIG. 3 is a sectional view taken on the line III—III in FIG. 2.
Figure 4:
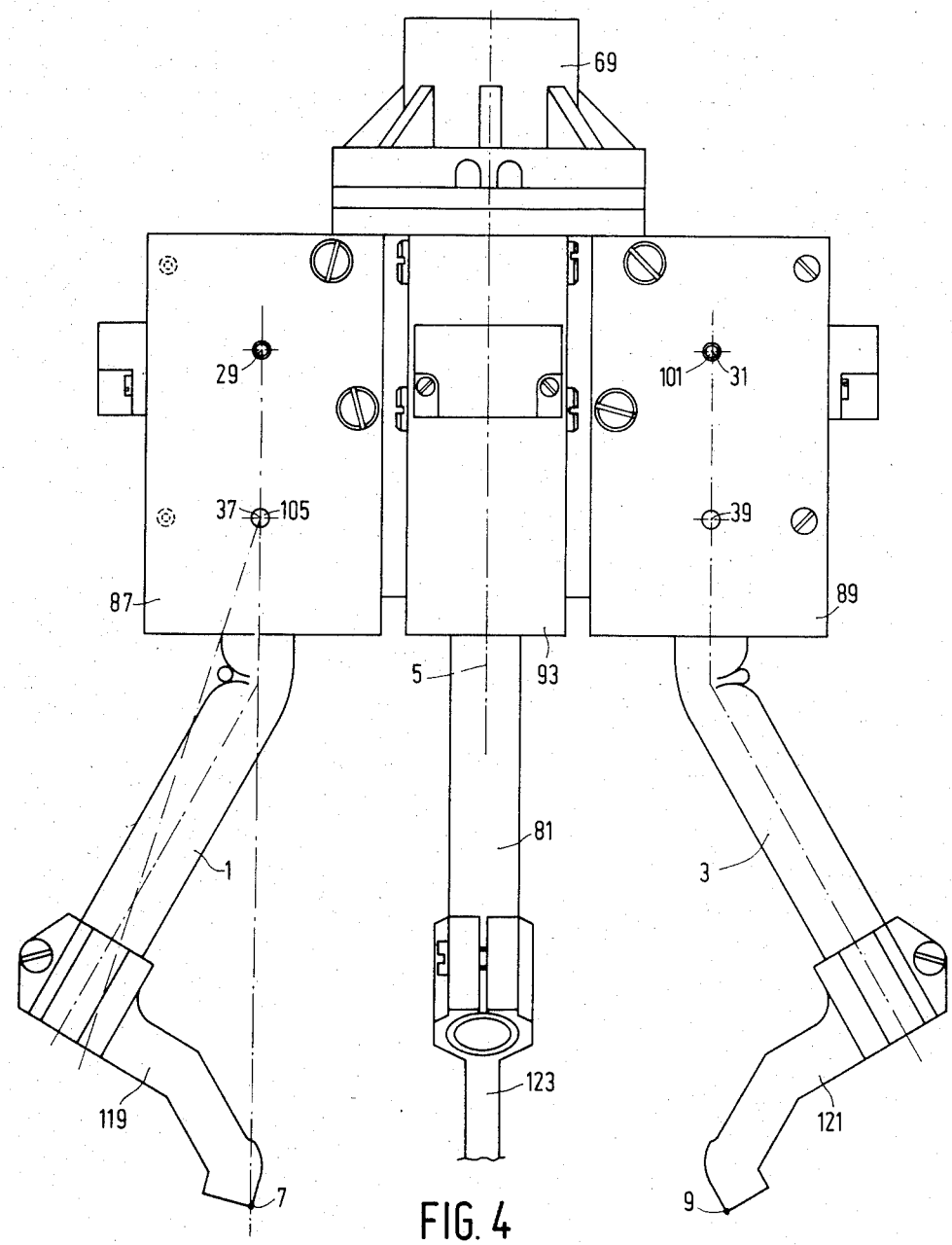
FIG. 4 is an elevation of the gripper shown in FIG. 2.

The gripper shown in FIGS. 2, 3 and 4 satisfies the principle described with reference to FIG. 1 only with the difference that instead of one pair of gripper arms two pairs of gripper arms are now present. The second pair of gripper arms is arranged so as to be rotated through 90° with respect to the first pair of gripper arms and is identical to the first pair. For the sake of clarity, in FIGS. 2, 3 and 4, reference numerals corresponding to FIG. 1 are used.

The gripper is suspended in a usual manner at the reference point P in a displacement mechanism, such as, for example, a robot, by means of a yoke 69. The yoke 69 can rotate about the centre line 5 and a shaft 71 arranged at right angles thereto. By means of a bolt 73, a housing 75 is secured to the yoke 69. The housing 75 accommodates four cylinders 65, 67, 77 and 79. The cylinders 65 and 67 correspond to the first pair of gripper arms 1 and 3, while the cylinders 77 and 79 shown in FIG. 3 correspond to the second pair of gripper arms, of which one gripper arm 81 is shown in FIG. 4. FIG. 3 also shows driving rods 83 and 85 corresponding to the cylinders 77 and 79. Four frames 87, 89, 91 and 93 are secured to the housing 75 and the gripper arms are journalled in these frames. The gripper arms 1 and 3 are journalled in the frames 87 and 89, while the gripper arm 81 is journalled in the frame 91. The fourth gripper arm of the second pair of gripper arms, which is journalled in the frame 93, is not shown in the FIGURES. The driving rods 57 and 59 are guided in tubular sliding bearings 95 and 97 secured to the housing 75. The bearings 53 and 55 formed at the ends of the driving rods 57 and 59 are also guided in the tubular sliding bearings 95 and 97. As appears from the righthand side of FIGS. 2, 3 and 4, the pivot 31 is constituted by stub shafts 99 and 101 secured to the crank rod 27 and rotatably journalled in the frame 89. The three remaining pivots are identical to the pivot 31. It appears from the lefthand side of FIGS. 2, 3 and 4 that the sliding guide 41 rotatable at the fixed point 37 is rotatably journalled in the frame 87 by means of stub shafts 103 and 105 secured to the sliding guide 41. The three remaining sliding guides are journalled in a corresponding manner. The sliding guides 41 and 43 are provided with bearing bushes 107, 109 and bearing bushes 111, 113, respectively, for guiding the gripper arms 1 and 3. The cylinders 65 and 67 are provided on the upper side with openings 115 and 117 for the supply and the relief, respectively, of air. Such openings (not shown) are also provided on the lower side of the cylinders 65 and 67. The pistons 61 and 63 are therefore double-acting. As is shown in FIG. 4, the gripper arms 1, 3 and 81 are provided with removable fingers 119, 121 and 123, by means of which there can be gripped internally as well as externally. When fingers of different lengths are chosen, the value of L can moreover be adapted to the displacement mechanism.

It should be noted that the cylinders of one pair of gripper arms can be connected on the upper side both via an individual electropneumatical servo-valve and via a common valve to a source of comparatively high and low pressure, respectively. This of course also applies to the lower side of the cylinders. In order to increase the rigidity and the accuracy of the gripper, the sliding guides 41 and 43 can be connected to each other by means of a coupling rod 125, which is rotatable in the points 127 and 129. The gripper can be provided both with one pair and with two pairs of gripper arms. Due to the fact that the gripper has a modular construction, a gripper arm, inclusive of journalling means, can be replaced in a simple manner. The construction chosen, in which a gripper arm is driven by means of a driving rod and a coupling rod, permits of obtaining a compact construction. Due to the pneumatic drive, the gripper has a comparatively small mass. The sliding guides can be driven in principle by means of any mechanism which may be pneumatically controlled or not and which imparts a rotation of these sliding guides and hence a combined rotation and translation to the gripper arms. Furthermore, the two sliding guides of one pair of gripper arms can be driven by means of a common plunger.

In those practical cases in which a slightly larger weight of the gripper is not objectionable, the gripper arms may also be driven in a non-pneumatic manner. This may be effected, for example, by an electric motor which is coupled through a gear wheel transmission to the rotatable sliding guides. A hydraulic drive is also possible if steps are taken to cause the gripping force in the gripping stage to increase gradually. In the case of a hydraulic drive, such steps are desirable because of the incompressibility of the hydraulic medium.

What is claimed is:

1. A gripper comprising at least two relatively displaceable first ends of two gripper arms arranged mirror-symmetrically around a centre line and at least two second ends of the said gripper arms displaceable along circles of equal diameters, characterized in that each of the gripper arms is supported between its first and its second end in a sliding guide which is rotatable about a point occupying a fixed position with respect to the centre of the circle along which the second end is displaceable, while for each gripper arm the connection line between the centre of the said circles and the point of rotation of the respective sliding guide is parallel to the said centre line and in a rectangular coordinate system with a Y axis parallel to the centre line and with the point of rotation of the sliding guide of each of the gripper arms as origin the relations are satisfied:

$Y = L \cos \beta - R \cos \alpha - c \leq Y_o$ $|Y - Y_o| = |L(\cos \beta - 1) - R(\cos \alpha - 1)| \leq |W|$, where:
Y = the distance of the point of rotation of the sliding guide from the first end of the perspective gripper arm, with $Y = Y_o$ for $\alpha = 0$,
$|Y - Y_o|$ = the absolute value of $Y - Y_o$
L = the length of the gripper arm,
$\beta$ = the angle between the gripper arm and the Y axis,
R = the radius of the circle along which the second end is displaceable,
c = the distance between the centre of a circle and the point of rotation of the respective sliding guide,
$\alpha$ = the angle between the Y axis and the radius vector of the second end,
$|W|$ = the absolute value of the maximum tolerance in a direction parallel to the Y axis of the position of the gripper at a reference point P.

2. A gripper as claimed in claim 1, characterized in that the sliding guide of each of the gripper arms is connected by means of a coupling rod to a driving rod independently controllable and extending parallel to the Y axis, the coupling rod being guided rotatably and slidably with respect to the driving rod.

3. A gripper as claimed in claim 2, characterized in that the driving rod forms part of a double-acting pneumatically driven plunger.

4. A gripper as claimed in claim 1, characterized in that the following relations are satisfied:
L = 129 mm
$\beta \leq 18°$
R = 8.5 mm
$\alpha \leq 77°$
W = 0.1 mm, while the distance between the centre of the circle along which the second end of a gripper arm is displaceable and the point of rotation of the respective sliding guide is equal to 23.5 mm.

* * * * *